United States Patent
Lendi

(10) Patent No.: US 11,906,989 B2
(45) Date of Patent: Feb. 20, 2024

(54) CLEANING PROCEDURE FOR A PIPE OR SHAFT WITH DIGITAL DATA MANAGEMENT

(71) Applicant: Enz Technik AG, Giswil (CH)

(72) Inventor: Christoph Lendi, Giswil (CH)

(73) Assignee: Enz Technik AG, Giswil (CH)

( * ) Notice: Subject to any disclaimer, the term of this patent is extended or adjusted under 35 U.S.C. 154(b) by 111 days.

(21) Appl. No.: 17/124,678

(22) Filed: Dec. 17, 2020

(65) Prior Publication Data

US 2021/0191430 A1   Jun. 24, 2021

(30) Foreign Application Priority Data

Dec. 18, 2019 (CH) ..................................... 1653/19

(51) Int. Cl.
| | |
|---|---|
| G05D 7/06 | (2006.01) |
| G06Q 50/26 | (2012.01) |
| H04N 5/76 | (2006.01) |
| H04N 7/18 | (2006.01) |
| H04N 5/77 | (2006.01) |
| B08B 3/02 | (2006.01) |
| B08B 9/027 | (2006.01) |
| G06Q 10/0639 | (2023.01) |
| G06Q 10/20 | (2023.01) |
| B08B 9/049 | (2006.01) |

(52) U.S. Cl.
CPC .......... *G05D 7/0676* (2013.01); *G06Q 50/26* (2013.01); *H04N 5/76* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 4,715,538 | A * | 12/1987 | Lingnau ................. | B26F 3/004 134/167 C |
| 2004/0160600 | A1* | 8/2004 | Drost ................... | G01N 21/954 356/241.1 |
| 2012/0224070 | A1* | 9/2012 | Burroff ................. | H04N 23/50 348/E5.025 |
| 2014/0247338 | A1* | 9/2014 | Kessler .................... | E03F 7/12 239/289 |

(Continued)

FOREIGN PATENT DOCUMENTS

KR 101943799 B1 * 1/2019 ........... G03B 37/005

*Primary Examiner* — Hung Q Dang
(74) *Attorney, Agent, or Firm* — Paul D. Bianco; Fleit Intellectual Property Law

(57) ABSTRACT

A procedure for cleaning a pipe or shaft with a cleaning nozzle operated with a cleaning liquid and having a camera module includes the following steps: recording a video during or after the cleaning; transmitting the video to a mobile device over a first distance; transmitting the video with collected corresponding position data of the cleaning location of the pipe or of the shaft to a memory, which is protected by a cleaning service provider and/or nozzle manufacturer, in a data cloud over a second distance; and making the protected memory in the data cloud of the cleaning service provider and/or nozzle manufacturer accessible by the customer commissioning the cleaning procedure. The recorded videos with stored road map are displayed on a screen, and each video with corresponding cleaning location can be accessed from the memory in the data cloud.

20 Claims, 2 Drawing Sheets

(56) References Cited

U.S. PATENT DOCUMENTS

2014/0333753 A1* 11/2014 Chapman .............. G03B 37/005
                                                        74/500.5
2018/0015512 A1*  1/2018 Lendi .................... H04N 5/2257
2019/0137169 A1*  5/2019 Hosokawa .............. F25D 23/00

* cited by examiner

CLEANING PROCEDURE FOR A PIPE OR SHAFT WITH DIGITAL DATA MANAGEMENT

TECHNICAL FIELD

The present invention describes a cleaning procedure with digital data management when cleaning a pipe or shaft by means of a cleaning nozzle operated with a cleaning liquid, wherein the cleaning nozzle has a camera module, and the cleaning procedure is performed by a cleaning service provider, as well as a cleaning nozzle and a cleaning means.

BACKGROUND

Pipes and shafts have been cleaned for some time by cleaning service providers by means of cleaning nozzles, which are inserted into the pipe or the shaft and which are operated there by means of cleaning liquids. A Customer commissions the cleaning service provider to free the desired pipes and shafts of dirt or deposits, respectively, of any type. In the past, the applicant has already filed a patent application for suitable cleaning nozzles.

Some years ago, the desire arose for inspecting the cleaning process during the cleaning and afterwards, in order to create a quality control for the cleaning. For this purpose, cleaning nozzles have been developed, which have a camera module, which comprises at least one camera and by means of which video films are recorded during or after the cleaning process. The applicant has also already published cleaning nozzles of this type in patent applications. Until now, the video films were uploaded directly to a device comprising a screen of the cleaning service provider at the cleaning location, so that a person was able to inspect the cleaning success after the cleaning, whereby the videos were recorded with the cleaning nozzle itself. So that the customer commissioning the pipe cleaning can inspect the results, the video films were delivered or made accessible, respectively, to the customer on data carriers after the cleaning. After the video films were recorded at the cleaning location, the data has recently even been provided so that it can be accessed online. So far, however, the videos had to be archived by hand, in order to be make them accessible online. The search and the control of the videos online was also associated with too much effort for the customer, so that more practical procedures were sought.

SUMMARY OF THE INVENTION

One aspect of the present invention relates to a cleaning procedure with digital data management, which has an improved user-friendliness for the customer commissioning the cleaning process. The cleaning results are to be capable of being archived easily, as a result of which the user-friendliness for the cleaning service provider RD is increased as well. Due to the fact that, due to the data management, the cleaning results can be accessed in a simplified manner by all parties involved, data can even be available in real time. It should be prevented thereby that data falls into the hands of unauthorized persons.

BRIEF DESCRIPTION OF THE DRAWINGS

The subject matter of the invention will be described in detail below in connection with the enclosed drawings. Necessary features, details, and preferences of the invention follow from this following description, whereby a preferred embodiment of the invention and some additional features or optional features are listed in detail.

FIG. 2a shows a screenshot of the app with access to the videos stored in the cloud with stored road map, while

DETAILED DESCRIPTION

Figure 1:
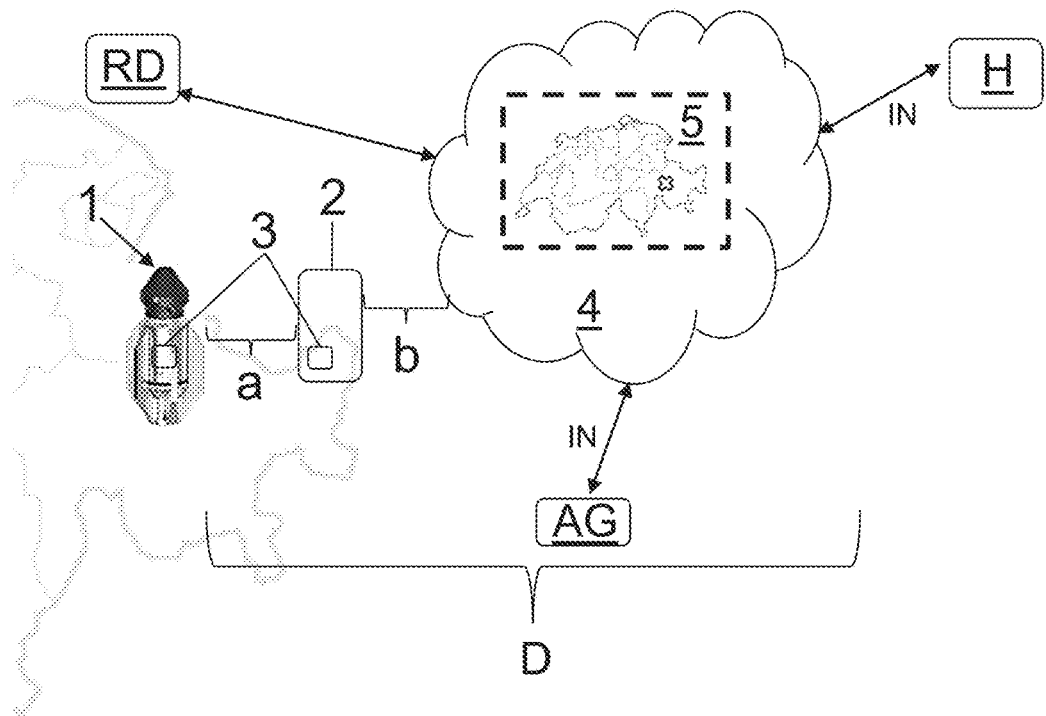
FIG. 1 shows a diagram of a cleaning procedure with digital data management when cleaning a pipe or shaft at a cleaning location by means of a cleaning nozzle, which is operated with a cleaning liquid, comprising a camera module.

The cleaning procedure uses a cleaning nozzle 1, wherein a data management system D, which is coupled to or follows, respectively, the cleaning procedure, makes it possible to further process a recorded video and additional data. A customer AG has ordered the performance of the cleaning procedure of a pipe or of a shaft at a cleaning location from a cleaning service provider RD. The cleaning service provider RD then performs the cleaning procedure, whereby data is stored in a memory in an automated manner. This memory is located in a data cloud 4 and can be accessed by the customer AG in particular in a simplified manner. In addition to the acquisition and storage of the data, the data management system D also comprises the access to or the capacity to make accessible, respectively, and the simple representation of the data of the cleaning process necessary for the quality control. The data management system D makes it possible for the digital data management to run after the actual cleaning process. The cleaning service provider RD and/or a nozzle manufacturer H provide the customer AG with a necessary app and the access to the memory in the data could 4. It is obvious thereby that cleaning service provider RD and/or nozzle manufacturer H have access to the memory in the data cloud 4.

Cleaning liquid, usually water, is applied by means of a high-pressure line to the cleaning nozzle 1, and the latter comprises at least one thrust nozzle, by means of which a propulsion through pipes and shafts can take place. A cleaning is performed, whereby the cleaning nozzle 1 is inserted into the pipe or the shaft, and the inner walls are cleaned by means of cleaning liquid.

The cleaning nozzle 1 comprises at least one camera module comprising at least one camera, by means of which videos can be recoded before, during, and/or after the cleaning process.

At least one light source should be arranged at the cleaning nozzle 1, so that the surrounding area is illuminated better when recording the video. The power supply for the camera module and the light source can take place by means of a cable, or by means of a battery or an installed accumulator, respectively, comprising a control. The cable can be part of the high-pressure line, which, in addition to the cleaning fluid, also conducts electrical signals. Particularly preferably, the cleaning nozzle 1 is of multi-part design and has at least one stator part and one rotor part. Matching camera modules with power supply and data transmission are known.

The recorded videos are transmitted by means of correspondingly provided means at the cleaning nozzle 1 over a first distance a to a mobile device 2 of the cleaning service provider RD, who performs the cleaning. For this purpose, the cleaning nozzle 1 has corresponding sending means or a data transmission device, by means of which the first distance a to the mobile device 2 is overcome via cable or wirelessly. The wireless transmission from the cleaning nozzle 1 to the mobile device 2 takes place wirelessly via known radio technology in ISM bands, for example as Bluetooth connection or as WLAN connection.

The mobile device 2 has a screen, on which an operator of the cleaning service provider RD can watch the video directly during the cleaning process or after the video was recorded on the mobile device 2.

In addition to the video, position data of the cleaning location of the pipe or of the shaft is collected in the cleaning nozzle 1 and/or in the mobile device 2 and is assigned to the recorded video. For this purpose, the cleaning nozzle 1 and/or the mobile device 2 has a position determination means 3 in the form of a GPS module 3. The position data of the position determination means 3 in the form of a global positioning system or global navigation satellite system, respectively, define unambiguous position data of the cleaning location, thus relating to the location where the cleaning nozzle 1 cleans. Unambiguous position data of the cleaning location in the mobile device 2 are thus assigned to the video for further use.

The mobile device 2 subsequently sends the video with corresponding position data over a second distance b into a memory in a data cloud 4 or a cloud memory, respectively, and is stored there. For this purpose, the mobile device 2 has to have a suitable data transmission device, which is operated by means of an app. The mobile device 2 or an app on the mobile device 2, respectively, can send the video and the corresponding position data of the cleaning location into the cloud 4 in real time, already while the video is recorded or offset in time only after the cleaning job has been completed, whereby cloud refers to the memory in the data cloud 4. The second distance b can represent a partially wired or partially wireless data transmission, respectively, into the cloud 4, whereby known wireless radio technology in ISM bands, in particular as WLAN connection, is also used here.

The data collection and the dispatch into the cloud 4 is preferably performed in an automatically controlled manner by means of an app on the mobile device 2 of the cleaning service provider RD. The control of the video recording by means of camera module of the cleaning nozzle 1, for example the setting of the brightness, zoom-in, or start and stop of the recording, can also take place by means of an app on the mobile device 2.

The memory in the data cloud 4 can be accessed by the cleaning service provider RD, so that the video and additional information can be stored to that location in an automated manner.

So that the customer AG likewise obtains access to the memory in the data cloud 4 comprising the videos and additional information commissioned by him, the customer AG has to be registered and authenticated with the cleaning service provider RD and/or with a nozzle manufacturer H in order to access the data cloud 4. This precautionary measure is necessary, so that no one obtains unauthorized access to cleaning data, comprising videos and additional information. The customer AG thus has to perform a registration or authentication, respectively, which, in the simplest case, can consist of a password protection, prior to the first access. The customer AG can then obtain access to the videos and additional information in the data cloud 4 even in real time. The access to the data cloud 4 thereby usually takes place via an Internet connection IN.

When the customer AG can access the protected memory in the data cloud 4 by means of registration and authentication, the customer AG has access to the recorded videos for the purpose of quality control. The data can be viewed and can also be stored locally at the customer AG.

In a particularly user-friendly manner, a programming of the data management system is provided, which allows the customer AG to access a road map, on which cleaning locations with created and stored videos are identified.

Figure 2A:
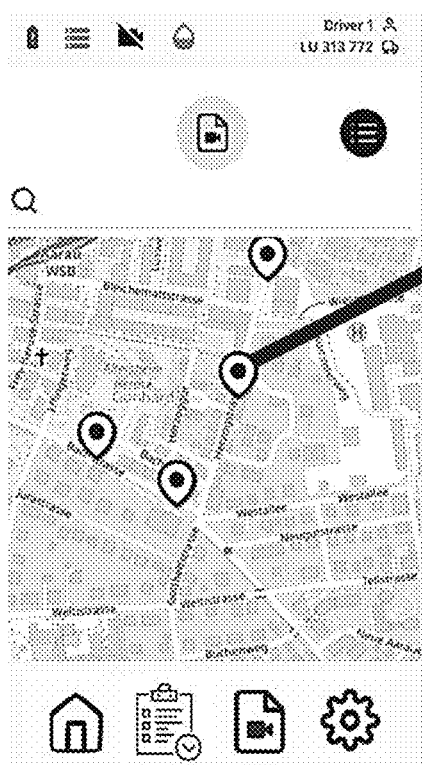
Figure 2B:
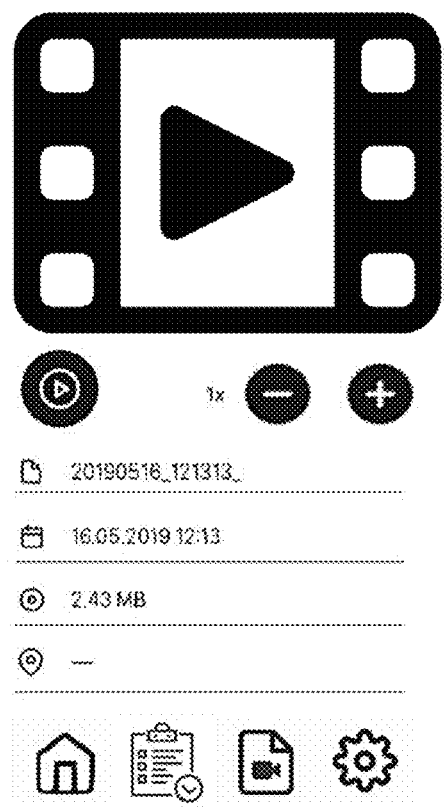
FIG. 2b shows a stored video in the upper portion and additional information in the lower portion of the screenshot.
Figure 3:
FIG. 3 shows a screenshot after registration and authentication in the memory of the data cloud by a customer in order to control the videos recorded at different cleaning locations.

If the customer AG uses a mobile device to access the protected memory in the data cloud 4, the app can be displayed on the mobile device according to FIG. 2a. Available videos are marked on a stored road map in the form of the balloons. When selecting one of the balloons, additional information is displayed and/or the recorded video of this cleaning location, which is shown in FIG. 2b. A browser view of a stored road map with cleaning locations shown in balloon form, at which videos are stored, is illustrated in FIG. 3. This data can be retrieved from the memory in the data cloud 4.

Start and stop of the video recording, the display of the current video recording, the superimposition of the video with the corresponding position data determined at the cleaning location, and the dispatch of the video data with corresponding position data can be performed by means of an app on the mobile device 2 of the cleaning service provider RD.

An improved display of the data from the memory of the data cloud 4 can be made accessible to the customer here by means of the collection and the transmission of the videos of the cleaned pipes or shafts, when linked with position data. The archiving of the videos is also simpler, whereby the position data can always also be stored and can accordingly be accessed for control purposes. The user-friendliness for the customer AG is significantly increased. As by-product, the data archiving by the cleaning service provider RD in the cloud 4 is simplified as well.

The cleaning nozzle 1 can optionally collect additional cleaning information, for example the used type of the cleaning nozzle, camera settings, as well as temperature, and/or humidity, during the video recording and can be transmitted to the mobile device 2 over the first distance a. For this purpose, corresponding sensors have to be arranged at the cleaning nozzle 1, so that the additional cleaning information can be determined. This can take place in an automated manner, preferably by means of an app on the mobile device 2.

Further additional information, such as the name of the person performing the cleaning, the company name of the cleaning service provider, and for example remarks relating to the surrounding area or condition of the pipes and shafts, can be input via the mobile device 2, assigned to the pipe and/or shaft to be cleaned. This additional information needs to be input manually at the mobile device. The points illustrated on the road map in the online display of the cleaning locations represent the cleaned shafts or pipes, at which videos are recorded and stored in the memory 4 in the data cloud.

LIST OF REFERENCE NUMERALS 1 cleaning nozzle
2 mobile device
3 position determination means/GPS module 4 memory in the data cloud/cloud storage network
RD cleaning service provider
AG customer
H nozzle manufacturer
D data management system
IN Internet connection
a,b data transmission connection (of the data management system, via cable or wirelessly)

The invention claimed is:

1. A cleaning method with digital data management for cleaning a pipe or shaft with a cleaning nozzle operated with a cleaning liquid, wherein the cleaning nozzle has a camera module, the method comprising:
   a) inserting the cleaning nozzle into the pipe or shaft at a cleaning location and then performing, by a cleaning service provider, a cleaning of the pipe or shaft using the cleaning nozzle such that inner walls of the pipe or shaft are cleaned by the cleaning liquid, the cleaning nozzle being a rotating nozzle propelled by the cleaning liquid;
   b) recording a video during the cleaning using the camera module of the cleaning nozzle;
   c) transmitting the video from the cleaning nozzle to a mobile device of the cleaning service provider in a wired or wireless manner over a first distance;
   d) transmitting the video with collected corresponding position data of the cleaning location of the pipe or shaft from the mobile device of the cleaning service provider to a memory in a cloud storage network over a second distance in real time while the video is recording during the cleaning, the video with collected corresponding position data of the cleaning location being stored in the memory in the cloud storage network, which is an offsite storage system maintained by a third party, so as to be accessible through the Internet, wherein a position determination means is arranged in the cleaning nozzle or in the mobile device, and the memory in the cloud storage network is protected by the cleaning service provider and/or nozzle manufacturer;
   e) making the memory in the cloud storage network accessible by prior registration and authentication of a customer commissioning the cleaning;
   f) displaying, to the customer, a road map illustrating multiple points that each represent a cleaning location at which a video was recorded and stored in the memory in the cloud storage network; and
   g) in response to the customer selecting one of the points illustrated on the road map, retrieving the recorded video of the cleaning location represented by that point from the memory in the cloud storage network.

2. The method according to claim 1, wherein steps b) to d) run in an automated manner, controlled by the mobile device of the cleaning service provider.

3. The method according to claim 1, wherein the transmission of the video from the cleaning nozzle to the mobile device of the cleaning service provider is performed wirelessly via radio technology in ISM bands.

4. The method according to claim 1, wherein the transmission of the video with corresponding position data of the cleaning location takes place by radio technology in ISM bands, between the mobile device of the cleaning service provider and the memory in the cloud storage network, which is protected by the cleaning service provider and/or nozzle manufacturer.

5. The method according to claim 1, wherein the video with corresponding position data of the cleaning location stored in the memory in the cloud storage network can only be accessed by the one customer who commissioned the cleaning and is registered and authenticated with the cleaning service provider and/or nozzle manufacturer.

6. The method according to claim 1, wherein an app is installed on the mobile device of the cleaning service provider, the app performing the position determination of the cleaning location, controlling the recording of the video, and performing the transmission of the video with corresponding position data of the cleaning location to the memory in the cloud storage network.

7. The method according to claim 1, wherein start and stop of the recording of the video, display of the video during recording, superimposition of the video with the corresponding position data of the cleaning location, and the transmission of the video with corresponding position data of the cleaning location are performed by an app on the mobile device of the cleaning service provider.

8. The method according to claim 1, wherein, prior to the transmission to the memory in the cloud storage network, additional cleaning information is collected by the cleaning nozzle during the recording of the video and is transmitted from the cleaning nozzle to the mobile device of the cleaning service provider over the first distance.

9. The method according to claim 8, wherein the additional cleaning information includes at least one of type of the cleaning nozzle or settings of the camera module.

10. The method according to claim 8, wherein sensors arranged on the cleaning nozzle provide the additional cleaning information.

11. The method according to claim 8, wherein, prior to the transmission to the memory in the cloud storage network, further additional cleaning information is inputted manually via the mobile device of the cleaning service provider.

12. The method according to claim 11, wherein the further additional cleaning information includes remarks relating to condition of the pipe or shaft.

13. A cleaning nozzle for performing the method of claim 1,
   wherein the cleaning nozzle is of multi-part design with a rotor part and a stator part,
   the cleaning nozzle includes the camera module that comprises at least one camera, and means for the transmission over the first distance, and
   the position determination means in the form of a GPS module is fastened in or at the cleaning nozzle.

14. The method according to claim 1, further comprising: providing in real time while the video is recording, to the one customer who commissioned the cleaning, access to the video with corresponding position data of the cleaning location that is stored in the memory in the cloud storage network.

15. The method according to claim 1, wherein step d) comprises displaying, to the customer, the recorded video of the cleaning location represented by the one point that was selected.

16. The method according to claim 1, wherein step d) comprises transmitting the entire video from the mobile device of the cleaning service provider to the memory in the cloud storage network in real time while the video is recording during the cleaning.

17. A cleaning system for cleaning a pipe or shaft, the cleaning system comprising:
   a cleaning nozzle comprising a camera module for recording a video during the cleaning at a cleaning location, and a first data transmission device for transmitting the video from the cleaning nozzle over a first distance, the cleaning nozzle being a rotating nozzle propelled by a cleaning liquid for cleaning inner walls of the pipe or shaft by the cleaning liquid;

a mobile device comprising a second data transmission device for receiving the video from the cleaning nozzle and transmitting the video with corresponding position data of the cleaning location of the pipe or shaft over a second distance to a memory in a cloud storage network in real time while the video is recording during the cleaning, which is protected by a cleaning service provider and/or nozzle manufacturer; and a display device having a screen for displaying, to a customer commissioning the cleaning, a road map illustrating multiple points that each represent a cleaning location at which a video was recorded and stored in the memory in the cloud storage network, wherein the mobile device is useable to display recorded videos and to control the camera module, a position determination element in the form of a GPS module is arranged in or at the cleaning nozzle or in the mobile device, videos with corresponding position data of the cleaning locations are stored in the memory of the cloud storage network, which is an offsite storage system maintained by a third party, so as to be accessible via the Internet from the memory in the cloud storage network, and in response to the customer selecting one of the points illustrated on the road map, the recorded video of the cleaning location represented by that point is retrieved from the memory in the cloud storage network.

18. The cleaning system according to claim 17, wherein the display device displays, to the customer, the recorded video of the cleaning location represented by the one point that was selected.

19. The cleaning system according to claim 17, wherein the video with corresponding position data of the cleaning location transmitted to the memory in the cloud storage network can only be accessed by the customer who commissioned the cleaning, the customer being registered and authenticated with the cleaning service provider and/or nozzle manufacturer.

20. The cleaning system according to claim 17, wherein the GPS module is arranged in the mobile device and performs the position determination of the cleaning location, and an app installed on the mobile device controls the recording of the video and the transmission of the video with corresponding position data of the cleaning location to the memory in the cloud storage network.

\* \* \* \* \*